United States Patent [19]

Gold

[11] Patent Number: 5,669,131

[45] Date of Patent: Sep. 23, 1997

[54] MANUALLY MODIFIED VEHICLE WINDOW MOLDING

[76] Inventor: Peter Gold, 1630-4 Ocean Ave., Bohemia, N.Y. 11716

[21] Appl. No.: 677,899

[22] Filed: Jul. 10, 1996

[51] Int. Cl.⁶ .......................... B23P 13/04; B21D 39/03; B60J 1/02; E06B 7/00
[52] U.S. Cl. ................ 29/407.05; 29/557; 264/117.17; 296/93; 296/63; 52/204.597
[58] Field of Search ................ 29/428, 407.05, 29/557, 527.1; 52/204.597, 204.53; 156/291, 292, 293, 264, 108, 267; 264/148, 161, 152, 40.1–40.7; 296/93, 200

[56] References Cited

U.S. PATENT DOCUMENTS

| | | | |
|---|---|---|---|
| 3,155,420 | 11/1964 | Belsky | 52/204.597 |
| 3,851,432 | 12/1974 | Griffin | 52/204.597 |
| 4,262,960 | 4/1981 | Fifer | 296/63 |
| 4,865,676 | 9/1989 | Kimura et al. | 264/117.17 |
| 5,133,537 | 7/1992 | Shirahata et al. | 296/93 |
| 5,149,168 | 9/1992 | Yada et al. | 296/200 |
| 5,447,671 | 9/1995 | Kato et al. | 264/148 |
| 5,549,346 | 8/1996 | Gold | 296/93 |

*Primary Examiner*—David P. Bryant
*Assistant Examiner*—Tisa Stewart
*Attorney, Agent, or Firm*—Myron Amer PC

[57] ABSTRACT

A variable width modification to an auto rear window peripheral edge molding achieved using a molding which is extruded with a longitudinal groove into which a knife is inserted for trimming off a portion of the outboard overhang of the molding crown so that as installed about the window the molding has a narrow trimmed width and a larger untrimmed width.

1 Claim, 2 Drawing Sheets

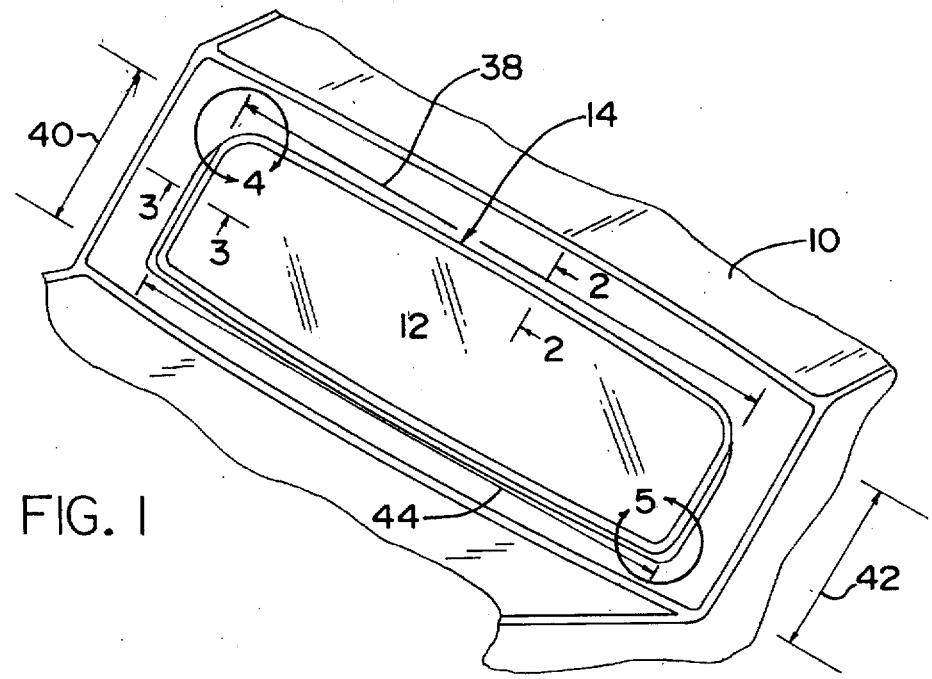
FIG. 1
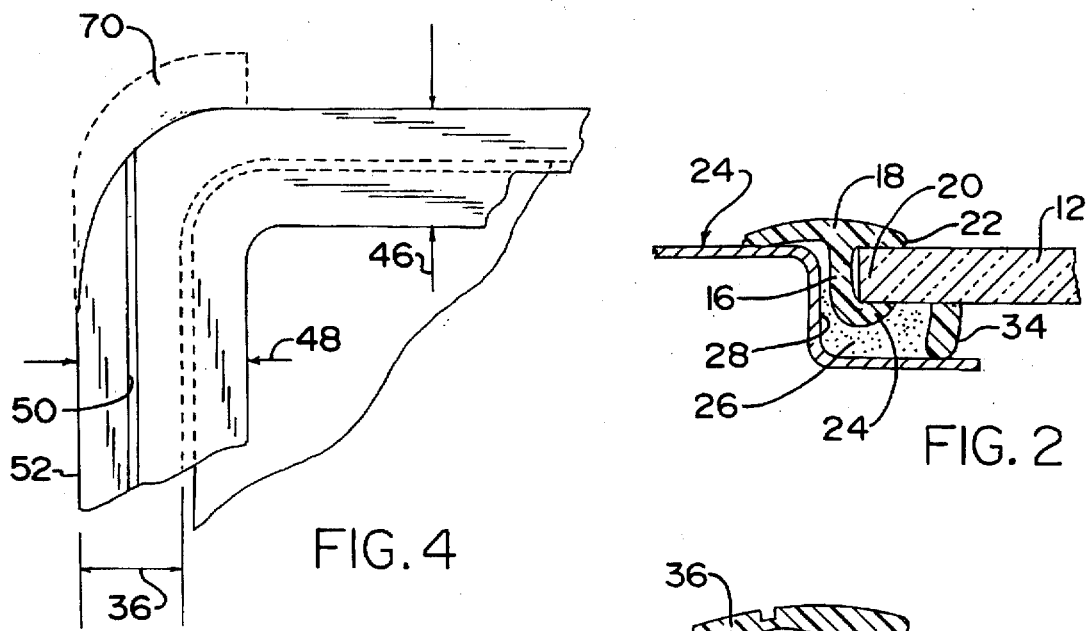
FIG. 4
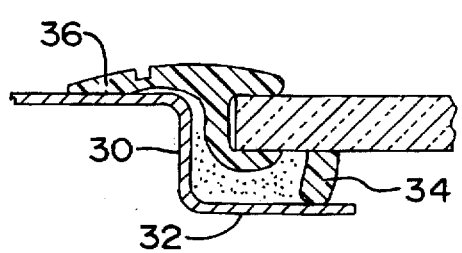
FIG. 2
FIG. 3

MANUALLY MODIFIED VEHICLE WINDOW MOLDING

The present invention relates generally to improvements for an auto rear window molding, the improvements more particularly enabling a display of the molding in different crown widths.

BACKGROUND OF THE INVENTION

In current practice, it is desirable to frame an auto glass window with an extruded elastomeric molding to obviate chipping in its peripheral edge, as well as to achieve other utilitarian benefits. In addition to the utility input of the molding, it is now also desirable to enhance the display of the molding in its installed position about the periphery of the window, particularly in the window located in the rear of the auto. Moreover, the display-enhancement of choice is having a reduced-width visible crown portion in the molding along the window top edge and full-width visible crown portions in the molding along the window opposite side edges.

Heretofore the molding crown width displayed was the width in which it was extruded, and thus a two-width crown display, for example, required two extrusions and the molding expense attendant thereto, such as two extrusion dies, two extrusion production runs of the molding, and like expenses.

SUMMARY OF THE INVENTION

Broadly, it is an object of the present invention to present a multiple crown-width molding in display about the periphery of an auto window overcoming the foregoing and other shortcomings of the prior art.

More particularly, it is an object to fashion from a molding extrusion production run a display condition in the extruded molding featuring different crown widths, all as will be better understood as the description proceeds.

BRIEF DESCRIPTION OF THE DRAWINGS

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a partial perspective view of an installed vehicle rear window peripherally framed by a molding having along selected length portions different widths resulting from a trimming of the molding in accordance with the present invention;

FIG. 2 is a sectional view taken along line 2—2 of FIG. 1 of the trimmed smaller-width molding length portion;

FIG. 3 is a similar sectional view, but taken along line 3—3 of FIG. 1 and of the untrimmed larger-width molding length portion;

FIG. 4 is a partial front elevational view of a window corner circumscribed by the circular reference line 4—4 of FIG. 1 illustrating the progression from trimmed to untrimmed widths of the molding;

DESCRIPTION OF THE PREFERRED EMBODIMENT

Figure 5:
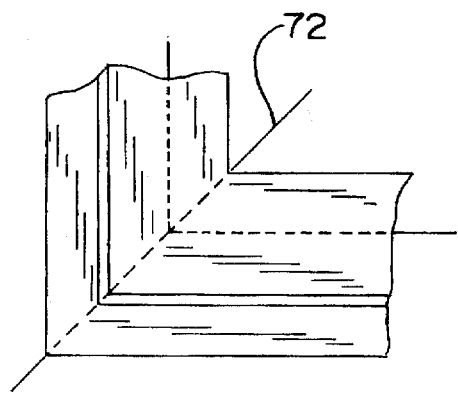
FIG. 5 is another partial front elevational view of a window corner, but at the corner circumscribed by the circular reference line 5—5 of FIG. 1.

FIG. 1 illustrates in a vehicle 10 a rear window 12 installed according to known techniques wherein a molding, generally designated 14, extruded in a T-shape in cross section with a central leg 16 depending from a crown 18 is engaged to a peripheral edge 20 of the window 12 between an inboard crown length portion 22 and a gripper leg 24 and seated on a body flange 24, and held in place by cured urethane 26 deposited in a compartment 28 bounded by flange walls 30 and 32 and a so-called dam 34.

What is not known heretofore of the molding 14 and constituting the within patentable advance is the embodiment in the crown outboard length portion 36 in selected lengthwise length portions thereof, in this illustrative example, along the top edge 38 and opposite side edges 40 and 42 and optionally if a molding trim is provided along the bottom edge 44, of different widths 46 and 48, the former width being of a trimmed smaller size coextensive with the top edge 38 and the latter width being of an untrimmed larger size coextensive with the opposite side edges 40 and 42. Heretofore in the prior practice of framing a rear window 12 a first extruded molding length portion with a smaller width is attached to the window top edge 38, and a second extruded molding length portion with a larger width is attached to the window opposite side edges 40 and 42.

Figure 6:
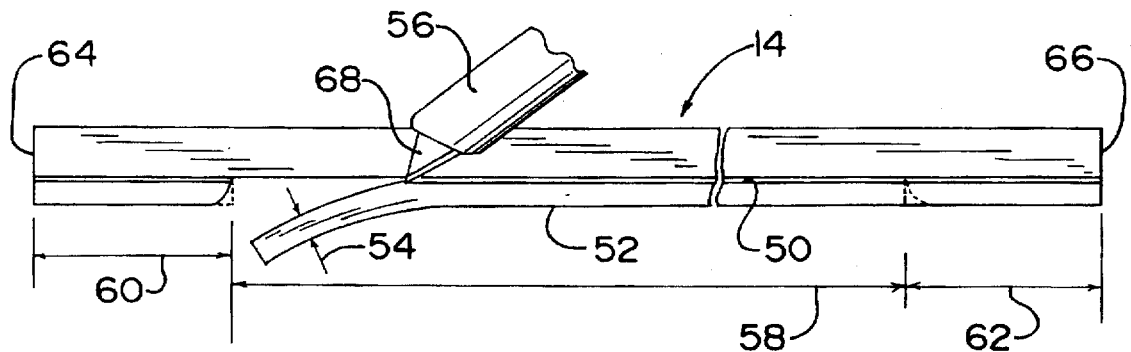
FIG. 6 is an insolated plan view of the molding illustrating the trimming thereof.

In accordance with the present invention, and as best understood from FIG. 6, there is provided a single extruded T-shaped molding 14 having a longitudinally oriented trimming groove 50 in spaced relation inwardly of an outboard edge 52 of the crown outboard length portion 36, there thusly being circumscribed a crown width 54 between the groove 50 and edge 52 marked for manual trimming using a knife 56, to reduce the molding width 48 to the width 46, along the lengthwise molding distance or extent 58, and leaving the larger untrimmed width 48 along the lengthwise molding distances or extents 60 and 62.

More particularly, using previously measured distance 38 and distances 40 and 42 corresponding respectively to the size of the window top edge 38 and to the sizes of the opposite window side edges 40 and 42, what should be the trimmed extent 58 and the untrimmed extents 60 and 62 are readily determined lengthwise of the molding 14 between the molding opposite ends 60 and 62, which results from separating or removing from the molding extrusion a molding sized to fit about the periphery of the window. It should be readily appreciated that the recessed-type configuration of the extruded groove 50 facilitates tracking along the crown outboard length 36 of the knife blade 68 and correspondingly facilitates the trimming removal of the crown width portion 54.

For a finished appearance, and as best understood from FIG. 4, the corner configuration denoted in phantom, as at 70, is manually trimmed off using the knife 56. Also, if the bottom edge 44 of the window 12 is framed with the molding 14, a finished appearance, as illustrated in FIG. 5, is readily achieved with a miter joint connection, as at 72, between opposite ends of a bottom molding length portion 44 with the ends of the molding sides 40 and 42.

Figure 7:
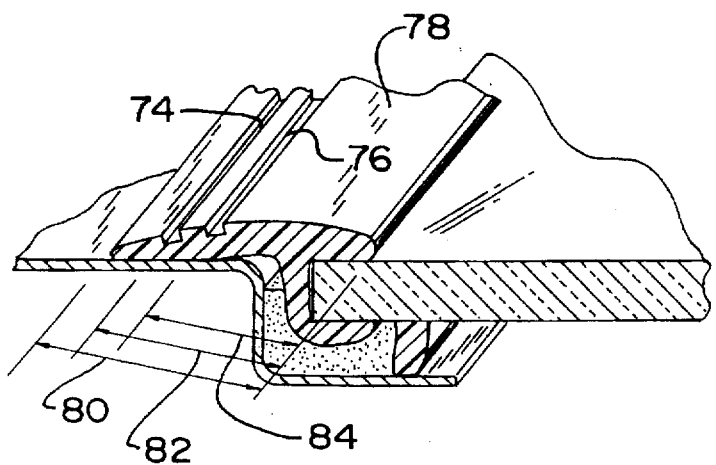
FIG. 7 is a perspective view similar to FIG. 3 but illustrating another embodiment of the molding.

In a second embodiment illustrated in FIG. 7, two longitudinal grooves 74 and 76 are extruded in the molding crown 78 providing the option of trimming down the crown width 80 to either width 82 or width 84.

While the method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A method of preparing an auto window molding for installation in an auto window opening about a peripheral edge of an auto window, said auto window molding of a type extruded in a T-shaped configuration consisting of a leg and a transversely oriented crown with inboard and outboard length portions respectively terminating in inboard and outboard edges, said method comprising the steps of extruding said T-shaped molding with at least one longitudinally oriented groove located in said crown outboard length portion so as to bound between said groove and said outboard edge a removable extent of the width of said crown outboard length portion, cutting to lengthwise size said extruded T-shaped molding to fit in circumferential relation about said peripheral edge of said window, measuring a selected length along said T-shaped molding destined to have a reduced width in said crown outboard length portion, inserting a cutting tool within said extruded groove, trimming along said extruded groove for said measured selected length therealong, and detaching said crown outboard length portion extending outboard from said groove to said outboard edge and extending longitudinally along the trimmed portion of the groove to provide said reduced width in said molding, whereby in the installed condition about said window peripheral edge said extruded T-shaped molding has two widths corresponding to untrimmed and trimmed length portions thereof.

* * * * *